(12) United States Patent
Liu et al.

(10) Patent No.: US 10,320,719 B2
(45) Date of Patent: Jun. 11, 2019

(54) MESSAGE WITHDRAWAL METHOD, APPARATUS AND STORAGE MEDIUM

(71) Applicant: Xiaomi Inc., Beijing (CN)

(72) Inventors: Tiejun Liu, Beijing (CN); Pengfei Zhang, Beijing (CN); Xingsheng Lin, Beijing (CN)

(73) Assignee: Xiaomi Inc., Beijing (CN)

( * ) Notice: Subject to any disclaimer, the term of this patent is extended or adjusted under 35 U.S.C. 154(b) by 129 days.

(21) Appl. No.: 15/248,697

(22) Filed: Aug. 26, 2016

(65) Prior Publication Data

US 2017/0149700 A1 May 25, 2017

(30) Foreign Application Priority Data

Nov. 24, 2015 (CN) .......................... 2015 1 0822615

(51) Int. Cl.
*H04L 12/58* (2006.01)
*G06F 16/28* (2019.01)
(Continued)

(52) U.S. Cl.
CPC .......... *H04L 51/04* (2013.01); *G06F 16/2379* (2019.01); *G06F 16/284* (2019.01); *H04L 51/046* (2013.01); *H04L 51/10* (2013.01); *H04L 51/12* (2013.01); *H04L 51/18* (2013.01); *H04L 67/1097* (2013.01)

(58) Field of Classification Search
CPC ..... H04L 51/04; H04L 51/12; H04L 67/1097; H04L 51/18; H04L 12/58; H04L 29/08; G06F 17/30; G06F 17/30595; G06F 17/30377
See application file for complete search history.

(56) References Cited

U.S. PATENT DOCUMENTS 7,752,271 B2 * 7/2010 Quinn .................... H04L 51/04
                                                  709/203
8,515,027 B2 * 8/2013 Shaffer ................. H04M 3/385
                                                  379/88.12
(Continued)

FOREIGN PATENT DOCUMENTS

CN       1988511 A     6/2007
CN     101193334 A     6/2008
(Continued)

OTHER PUBLICATIONS

Extended European Search Report issued in corresponding EP Application No. EP16183965, dated Mar. 27, 2017, 8 pages.
(Continued)

*Primary Examiner* — Benjamin M Thieu
(74) *Attorney, Agent, or Firm* — Arch & Lake LLP (57) ABSTRACT

A message withdrawal method, apparatus and a storage medium are disclosed. The method includes receiving a message withdrawal instruction, where the message withdrawal instruction at least includes a message identifier of a target message to be withdrawn, determining a storage path of a target network resource according to a mapping relation between a storage location of a downloaded network resource and the message identifier, deleting the target message using the message identifier, and deleting the target network resource at the storage path of the target network resource.

15 Claims, 5 Drawing Sheets

(51) Int. Cl.
*G06F 16/23* (2019.01)
*H04L 29/08* (2006.01)

(56) References Cited

U.S. PATENT DOCUMENTS

| | | | |
|---|---|---|---|
| 2006/0020670 A1* | 1/2006 | Anderson | G06Q 10/10 709/206 |
| 2009/0049134 A1* | 2/2009 | Kumhyr | G06Q 10/107 709/206 |
| 2009/0089378 A1* | 4/2009 | Maresh | G06Q 10/107 709/206 |
| 2010/0057869 A1 | 3/2010 | Stavrou et al. | |
| 2010/0235458 A1* | 9/2010 | Quinn | H04L 51/04 709/206 |
| 2013/0218982 A1* | 8/2013 | Hymel | G06Q 10/1093 709/206 |
| 2014/0082105 A1* | 3/2014 | Du | G06F 15/16 709/206 |
| 2015/0236990 A1* | 8/2015 | Shan | H04L 51/046 709/206 |
| 2015/0312197 A1 | 10/2015 | Dong et al. | |
| 2016/0065571 A1* | 3/2016 | Hoyos | H04L 63/0861 713/168 |
| 2016/0156782 A1* | 6/2016 | Mumick | H04W 4/14 455/413 |
| 2017/0019359 A1* | 1/2017 | Yang | H04L 51/38 |

FOREIGN PATENT DOCUMENTS

| | | |
|---|---|---|
| CN | 102999606 A | 3/2013 |
| CN | 103617519 A | 3/2014 |
| CN | 105490919 A | 4/2016 |
| CN | 105634920 A | 6/2016 |
| JP | 2004318686 A | 11/2004 |
| JP | 2006163882 A | 6/2006 |
| JP | 2009205524 A | 9/2009 |
| JP | 2011258035 A * | 12/2011 |
| JP | 2011258035 A | 12/2011 |
| WO | 2012113256 A1 | 8/2012 |
| WO | 2015043213 A1 | 4/2015 |

OTHER PUBLICATIONS

International Search Report issued in PCT Application No. PCT/CN2016/082690, dated Jul. 27, 2016, 11 pages.

International Preliminary Report on Patentability (including English translation) dated May 29, 2018 issued in corresponding International Application No. PCT/CN2016/082690, 12 pages.

First Office Action (including English translation) issued in corresponding Chinese Application No. 201510822615.7 dated Jan. 29, 2018, 12 pages.

Office Action issued in corresponding Japanese Application No. 2016-549452 dated Feb. 6, 2018, 5 pages.

* cited by examiner

MESSAGE WITHDRAWAL METHOD, APPARATUS AND STORAGE MEDIUM

This application is based upon and claims the priority from the Chinese Patent Application No. 201510822615.7, filed on Nov. 24, 2015, which is incorporated herein by reference in its entirety.

TECHNICAL FIELD

The present disclosure relates to the field of network technology, and more particularly, to a message withdrawal method, apparatus and storage medium.

BACKGROUND

With rapid development of network technology, numerous message interaction services are provided based on networks having enormous carrying capacity. For example, users may perform message interaction by instant messaging (IM) chatting software applications. Sometimes, the communicated messages include a type of network resource messages, which include picture messages, video messages, file messages and the like. When a user sends such messages, other users are capable of downloading the messages. In operation, due to mistakes and/or misoperations and/or other reasons, a user who sends the messages may need to withdraw a message that has been sent and uploaded by one or more other users. As such, the user may need the message withdrawal method, apparatus and storage medium to withdraw the sent message. The user may further need the removal of network resources that are associated with the sent message. However, technical challenges exist for developing the message withdrawal method, apparatus and storage medium to withdraw the sent message.

SUMMARY

According to a first aspect of the examples of the present disclosure, a message withdrawal method is provided. The method may include: receiving a message withdrawal instruction, wherein the message withdrawal instruction may include at least a message identifier of a target message to be withdrawn, determining a storage path of a target network resource according to a mapping relation between a storage location of a downloaded network resource and the message identifier where the target network resource may be a network resource downloaded from the target message, deleting the target message using the message identifier, and deleting the target network resource at the storage path of the target network resource.

According to a second aspect of the examples of the present disclosure, a message withdrawal apparatus is provided. The apparatus may include a processor and a memory for storing instructions executable by the processor. The processor may be configured to: receive a message withdrawal instruction where the message withdrawal instruction may include at least a message identifier of a target message to be withdrawn, determine a storage path of a target network resource according to a mapping relation between a storage location of a downloaded network resource and the message identifier where the target network resource is a network resource downloaded from the target message, delete the target message identified by the message identifier, and delete the target network resource at the storage path of the target network resource.

According to a third aspect of the examples of the present disclosure, a non-transitory computer-readable storage medium having stored instructions is provided. The stored instructions, when executed by a processor of a mobile terminal, may cause the mobile terminal to: receive a message withdrawal instruction where the message withdrawal instruction may include at least a message identifier of a target message to be withdrawn, determine a storage path of a target network resource according to a mapping relation between a storage location of a downloaded network resource and the message identifier where the target network resource may be a network resource downloaded from the target message, delete the target message identified by the message identifier, and delete the target network resource at the storage path of the target network resource.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present application. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise presented. The examples set forth in the following description of examples do not represent all examples consistent with the disclosure. Instead, they are merely examples of apparatuses and methods consistent with aspects related to the disclosure as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

A message withdrawal method provided in the examples of the present disclosure is executed by a terminal, in which a social application client, such as an instant messaging (IM) chatting software application, is run. The client is used for message interaction and network resource downloading. The terminal may be a device such as a mobile phone, a tablet computer or a computer. However, the application client may not be limited to the IM application. It may be an email system or any other network information delivery applications.

Figure 1:
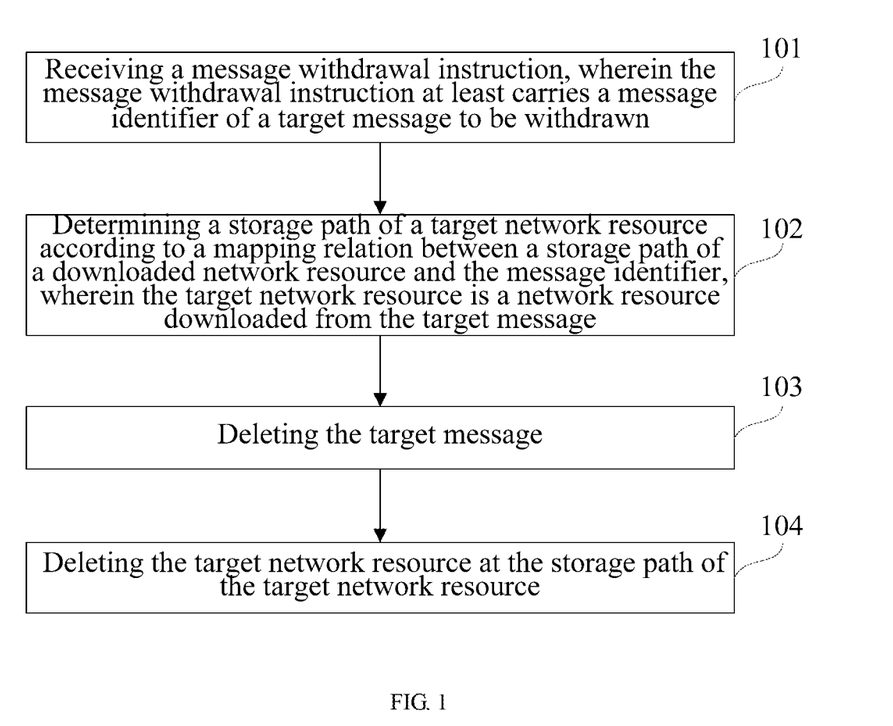
FIG. 1 is a flow chart illustrating a message withdrawal method according to one example.

FIG. 1 is a flow chart illustrating a message withdrawal method according to one example. The example is illustrated by taking an example where the message withdrawal method is performed by a terminal. The message withdrawal method may include following steps.

In step 101, a message withdrawal instruction is received where the message withdrawal instruction may include at least a message identifier of a target message to be withdrawn.

In step 102, a storage path of a target network resource is determined according to a mapping relation between a storage location of a downloaded network resource and the message identifier where the target network resource may be a network resource downloaded from the target message.

In step 103, the target message is deleted and the target message is identifiable by using the message identifier.

In step 104, the target network resource is deleted at the storage path of the target network resource.

According to the method provided in the example of the present disclosure, a message withdrawal instruction is received. According to a message identifier included in the message withdrawal instruction and a mapping relation between a storage location of a downloaded target network resource and the message identifier of the target message, a storage path of a network resource to be deleted is determined. Thus, the target network resource at the storage path and the target message to be withdrawn are deleted. As such, even if a user downloads the target network resource locally to his/her terminal, the terminal may automatically delete the target network resource. Thus, leakage of network resource may be avoided and thoroughness of message withdrawal may be ensured.

In one possible implementation based on the above example, before receiving the message withdrawal instruction, the method may further include: receiving the target information wherein the target message may include the target network resource, downloading the target network resource included in the target message according to a downloading operation of a user, and establishing a mapping relation between the storage path of the target network resource and the message identifier of the target message.

After the terminal receives the message and downloads the target network resource included in the message, the mapping relation between the storage path of the target network resource and the message identifier of the message is established, so that the terminal can determine the storage path of the target network resource according to the message identifier of the message, thereby ensuring that the target network resource can be found.

In another possible implementation, after establishing the mapping relation between the storage path of the target network resource and the message identifier of the target message, the method may further include: updating the storage path of the target network resource in the mapping relation between the storage path or storage location of the downloaded network resource and the message identifier when a change of the storage path of the target network resource is detected.

As such, even if the user modifies a storage position of the target network resource, the terminal can determine the storage path of the target network resource based on the updated mapping relation. Thus, reliability of message withdrawal is improved.

In another possible implementation, after establishing the mapping relation between the storage path of the target network resource and the message identifier of the target message, the method may further include: taking each of a target storage path corresponding to a copy-and-paste operation and the storage path of the target network resource as the storage path corresponding to the message identifier of the target message when the copy-and-paste operation on the target network resource is detected.

By taking also a target storage path corresponding to a copy-and-paste operation as the storage path corresponding to the message identifier of the target message when the copy-and-paste operation on the target network resource is detected, thoroughness of message withdrawal can be ensured.

In another possible implementation, the message withdrawal instruction is triggered when a message server receives a withdrawal request of a message sender for the target message.

By sending the message withdrawal instruction to the terminal when the server receives a withdrawal request of the message sender for the target message, accuracy of message withdrawal can be ensured.

In another possible implementation, downloading the target network resource included in the target message according to the downloading operation of the user may include: interrupting a process of downloading the target network resource if the message withdrawal instruction is received in the process of downloading.

Such interruption may stop the download when contents to be downloaded need to be deleted. Thus, the unnecessary download may be saved. By interrupting the downloading process when the message withdrawal instruction is received in the process of downloading, flexibility of message withdrawal can be improved.

In another possible implementation, after deleting the target network resource at the storage path of the target network resource, the method may further include: displaying a deletion prompt message, which indicates that the target network resource and the target message have been deleted locally.

By displaying a prompt after the terminal deletes the target network resource and the target message, the user can be prevented from being confused by automatic deleting, and user experience may be improved.

In another possible implementation, the target network resource is a picture, a video, an audio, an animation or a document. The target network resource may be associated with the message to be withdrawn. The deletion of the target network resource along with the deletion of the message would ensure the contents sent from the sender are completely deleted at the receiver terminal.

The target network resource may include any of the above network resources, and the variety of the network resource to be withdrawn is achieved. Thus, applicability of message withdrawal is improved.

All the foregoing optional technical solutions may be combined in any manner to form optional examples of the present disclosure, which are not described in detail one by one herein.

Figure 2:
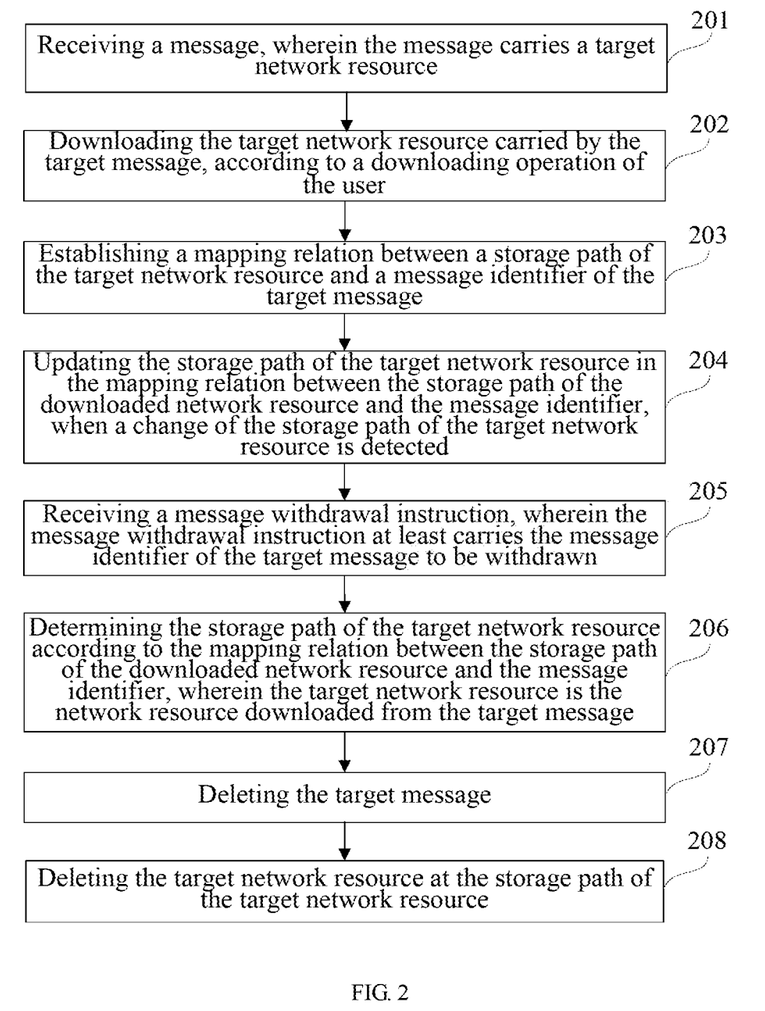
FIG. 2 is a flow chart illustrating a message withdrawal method according to another example.

FIG. 2 is a flow chart illustrating a message withdrawal method according to another example. The present example is illustrated by taking an example where the message withdrawal method is performed by a terminal. The message withdrawal method may include following steps.

In step 201, a message is received where the message may include a target network resource. The target network resource may be a picture, a video, an audio, an animation or a document that are associated with the message.

According to the method provided in the example of the present disclosure, in order to determine the target network resource according to the message withdrawal instruction before executing the operation of deleting the target network resource, the terminal needs to establish a mapping relation between a message identifier of the target message and a local storage path of the target network resource after receiving the target message and downloading the target network resource included in the target message. Thus, when the instruction of withdrawing the target message is received, the terminal can determine the target network resource according to the message identifier included in the withdrawal instruction and the mapping relation.

The message received by the terminal may be sent by any other terminal, and the message may include a network resource. The message may only include the network resource, for example, the message is a picture message sent during instant communication conversation with another user. The message may also include the network resource and other contents, for example, the message includes a picture and a paragraph of text.

The target network resource may be a picture, a video, an audio, an animation or a document. The target network resource may also refer to a compressed file of any of the above forms of resources, for example, the target network resource may include a compressed file M, formed by compressing a document m1 and a document m2.

In step 202, the target network resource included in the target message may be downloaded according to a downloading operation.

After the terminal receives the target message sent by any other terminal, the user may download the target network resource included in the target message. The terminal may download the target network resource to a storage position designated by the user when the terminal detects the downloading operation of the user on the target network resource. Accordingly, the terminal may obtain a storage path of the target network resource. For example, the terminal downloads a document resourceA to a storage position E:\document. Then, the terminal may obtain the storage path of the document resourceA as E:\document\resourceA.doc. The terminal may also download the target network resource to a system default storage position. For example, the system default storage position is C:\. Then, the terminal may download the document resourceA to the storage position C:\. In this case, the storage path of the document resourceA is C:\resourceA.doc.

The terminal may receive a certain target message, and the target network resource included in the target message may be the document resourceA, and the storage position designated by the user may be E:\document. Then, when detecting the downloading operation on the document resourceA, the terminal downloads the document resourceA to the storage position E:\document, and obtains the storage path of the document resourceA as E:\document\resourceA.doc.

In one possible implementation, if a message withdrawal instruction is received in a process of downloading the target network resource, the downloading process may be interrupted, and subsequent steps may not be executed. In such case, the terminal may prevent the user from performing any operation on the target message. Thus, the terminal allows no operation to be executed by the user in a currently displayed interaction interface until the target message is withdrawn. Operations not allowed to be executed include but are not limited to operations such as forwarding, collecting or copying.

In step 203, a mapping relation between a storage path of the target network resource and a message identifier of the target message is established.

The message identifier of the target message is used for uniquely identifying the target message, so that the terminal can uniquely determine the target message according to the message identifier.

The terminal may maintain a database, which takes the message identifier as an index to store the mapping relation between the storage path of the target network resource and the message identifier of the target message. Based on the mapping relation, the terminal may uniquely determine the storage path of the target network resource according to the message identifier of the target message.

If the message identifier of the target message carrying the document resourceA is message ID A as in the above examples, then after the document resourceA is downloaded the terminal establishes the mapping relation between the storage path or the storage location E:\document\resourceA.doc and the message identifier message ID A of the target message and stores the mapping relation in the database.

In one possible implementation, the user may also copy and paste the downloaded target network resource. In such case, the copied and pasted target network resource corresponds to a new storage path. In order to ensure thorough deletion of the target network resource, the copied and pasted target network resource also needs to be deleted. Hence, each of a target storage path corresponding to a copy-and-paste operation and the storage path of the target network resource is taken as the storage path corresponding to the message identifier of the target message when the copy-and-paste operation on the target network resource is detected. Thus, the terminal not only establishes the mapping relation between the storage path of the target network resource and the message identifier of the target message, but also establishes the mapping relation between the target storage path corresponding to the copy-and-paste operation and the message identifier of the target message.

By taking also the target storage path corresponding to the copy-and-paste operation as the storage path corresponding to the message identifier of the target message when the copy-and-paste operation on the target network resource is detected, thoroughness of message withdrawal can be ensured.

For example, if the storage position of the document resourceA is E:\document, then the storage path of the document resourceA is E:\document\resourceA.doc. When the user copies and pastes the document resourceA and stores the copied and pasted document resourceA to a storage position D:\document, then the storage path of the copied and pasted document resourceA is D:\document\resourceA.doc. The terminal takes each of E:\document\resourceA.doc and D:\document\resourceA.doc as the storage path corresponding to the message identifier message ID A. Thus, the terminal respectively establishes the mapping relation between the storage path D:\document\resourceA.doc and the message identifier message ID A and the mapping relation between the storage path E:\document\resourceA.doc and the message identifier message ID A.

Sometimes, the storage path for the target network resource may be changed. For example, when a user receives a photo, he or she may save the photo to a particular storage place. As such, the change of the storage path for the target network resource may be tracked and may be stored in a non-transitory computer-readable medium. When the target network resource needs to be identified, the tracked change of the storage path for the target network resource may be retrieved and may be used for identifying the target network resource.

In some other situations, the deletion of the network resource may not be successful. For example, the photo in the storage path may not be found, or the photo may be in a deletion protected mode and may not be deleted. When the deletion of the network resource fails, a reminding message may be delivered to the user. For example, the reminding message may be displayed to the sender's mobile phone when the deletion of the network source fails. However, the reminding message may be delivered to the user in other ways. For example, a special sound or a short music may be played when the deletion fails.

In step 204, the storage path of the target network resource is updated in the mapping relation between the storage path of the downloaded network resource and the message identifier when a change of the storage path of the target network resource is detected.

In implementation, the user may modify the storage position of the target network resource. Correspondingly, the storage path of the target network resource is modified. The operation of modifying the storage position of the target network resource may include modifying a folder name at the end of the storage position of the target network resource. For example, if the document folder in the storage position of the document resourceA E:\document is renamed as folder, then the modified storage position of the document resourceA is E:\folder. Correspondingly, the storage path of the document resourceA is modified to E:\folder\resourceA.doc from E:\document\resourceA.doc. Alternatively, the operation of modifying the storage position of the target network resource may refer to moving the target network resource to another storage position having a different root catalog. For example, the document resourceA in the storage position E:\document is moved to the storage position F:\document, Correspondingly, the storage path of the document resourceA is modified to F:\document\resourceA.doc from E:\document\resourceA.doc.

When detecting that the storage path of the target network resource is changed, the terminal obtains the changed storage path, and updates the original storage path in the mapping relation between the storage path of the downloaded network resource and the message identifier stored in the database to the changed storage path.

As such, even if the local storage path of the target network resource is changed, the terminal may obtain the changed storage path, update the storage path of the target network resource in the mapping relation and determine the storage path of the target network resource according to the updated mapping relation. As such, reliability of deleting the target network resource can be improved.

For example, the original storage position of the document resourceA is E:\document. Now, the user moves the document resourceA to the storage position F:\document, and then the storage path of the document resourceA is changed to F:\document\resourceA.doc from the original E:\document\resourceA.doc. When detecting the change, the terminal updates E:\document\resourceA.doc in the mapping relation between E:\document\resourceA.doc and the message identifier ID A stored in the database to F:\document\resourceA.doc. Thus, the terminal reestablishes the mapping relation between the message identifier message ID A and F:\document\resourceA.doc.

In step 205, a message withdrawal instruction is received where the message withdrawal instruction may at least include the message identifier of the target message to be withdrawn.

The message withdrawal instruction is triggered when a message server receives a withdrawal request of a message sender for the target message. The message sender, who wants to withdraw a sent message, may submit the withdrawal request for the target message, which may include the message identifier of the target message, to the server by using a message withdrawal key provided by a client. The server receives the withdrawal request for the target message and sends to a target message receiving terminal a message withdrawal instruction which includes the message identifier of the target message. Then, the target message receiving terminal deletes the target message and the network resource belonging to the target message.

When receiving the target message withdrawal instruction pushed by the server, the terminal obtains the message identifier included in the target message withdrawal instruction.

In step 206, the storage path of the target network resource is determined according to the mapping relation between the storage location of the downloaded network resource and the message identifier where the target network resource may be a network resource downloaded from the target message.

The terminal may determine the storage path of the target network resource from the database according to the message identifier included in the message withdrawal instruction and the mapping relation between the storage location of the downloaded network resource and the message identifier stored in the database. Then, the target network resource may be found.

For example, the message identifier included in the message withdrawal instruction is message ID A. According to the message identifier message ID A and based on the mapping relation between the storage location of the downloaded network resource and the message identifier message ID A, the terminal determines from the database a storage path E:\document\resourceA.doc having a mapping relation with the message identifier message ID A. At the storage path E:\document\resourceA.doc, the target network resource resourceA can be found.

In step 207, the target message that can be identified by the message identifier is deleted.

The terminal deletes the target message according to the message identifier included in the message withdrawal instruction. As in the above examples, the terminal determines the target message according to the message identifier message ID A included in the message withdrawal instruction, and deletes the determined target message. After a message is received, the message may be stored in a designated folder, and the terminal deletes the target message to be withdrawn from the designated folder.

In step 208, the target network resource is deleted at the storage path of the target network resource.

The terminal deletes the target network resource at the storage path determined based on the message identifier according to the step 206. As in the above examples, the terminal determines the storage path of the document resourceA as E:\document\resourceA.doc according to the message identifier message ID A, and deletes the document resourceA at the storage path.

In one possible implementation, after deleting the target network resource, the terminal may display a deletion prompt message, which indicates that the target network resource and the target message have been deleted locally. By displaying a prompt after the terminal deletes the target network resource and the target message, the user can be prevented from being confused by automatic deleting, and user experience may be improved.

According to the method provided in the example of the present disclosure, a message withdrawal instruction is received, according to a message identifier included in the message withdrawal instruction and a mapping relation between a storage location of a downloaded target network resource and the message identifier of the target message, a storage path of a network resource to be deleted is determined, and the target network resource at the storage path and the target message to be withdrawn are deleted. As such, even if a user downloads the target network resource locally to his/her terminal, the terminal may automatically delete the target network resource, thus leakage of network resource may be avoided and thoroughness of message withdrawal may be ensured.

The following describes apparatus examples of the present disclosure, which are configured to execute the method examples of the present disclosure. For details not disclosed in the apparatus examples of the present disclosure, reference can be made to the method examples of the present disclosure.

Figure 3:
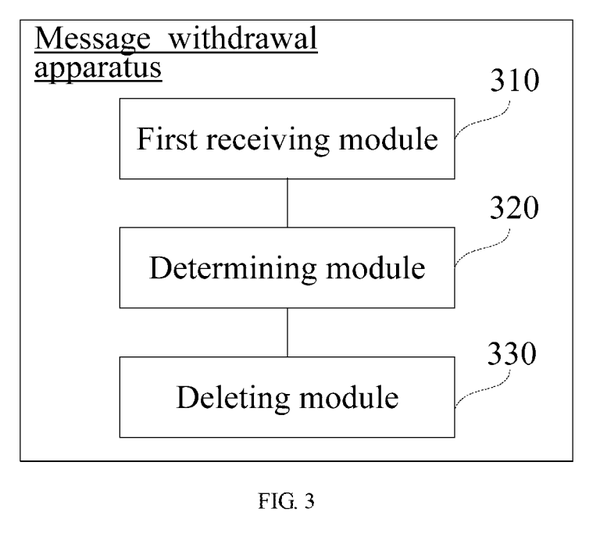
FIG. 3 is a block diagram illustrating a message withdrawal apparatus according to one example.

FIG. 3 is a block diagram illustrating a message withdrawal apparatus according to an example. The message withdrawal apparatus may be implemented as a terminal or a part of it by software, hardware or a combination thereof. The message withdrawal apparatus may include the following modules.

A first receiving module 310 is configured to receive a message withdrawal instruction where the message withdrawal instruction may include at least a message identifier of a target message to be withdrawn.

The first receiving module 310 may be a first receiver that may have at least one processor and a memory that is communicably connected with the at least one processor for storing instructions executable by the at least one processor. The execution of the instructions by the at least one processor may cause the at least one processor to receive one or more messages.

A determining module 320 is configured to determine a storage path of a target network resource according to a mapping relation between a storage location of a downloaded network resource and the message identifier, where the target network resource is a network resource downloaded from the target message indicated by the message identifier received by the first receiving module 310.

The determining module 320 may be a determiner that may have at least one processor and a memory that is communicably connected with the at least one processor for storing instructions executable by the at least one processor. The execution of the instructions by the at least one processor may cause the at least one processor to determine the storage path of a target network resource.

A deleting module 330 may be configured to delete the target message indicated by the message identifier received by the first receiving module 310.

The deleting module may be a remover that may have at least one processor and a memory that is communicably connected with the at least one processor for storing instructions executable by the at least one processor. The execution of the instructions by the at least one processor may cause the at least one processor to delete the target message.

The deleting module 330 may be further configured to delete the target network resource at the storage path of the target network resource determined by the determining module 320.

According to the apparatus provided in the example of the present disclosure, a message withdrawal instruction is received. According to a message identifier included in the message withdrawal instruction and a mapping relation between a storage location of a downloaded target network resource and the message identifier of the target message, a storage path of a network resource to be deleted is determined. Thus, the target network resource at the storage path and the target message to be withdrawn are deleted. As such, even if a user downloads the target network resource locally to his/her terminal, the terminal may automatically delete the target network resource. Thus, leakage of network resource may be avoided and thoroughness of message withdrawal may be ensured.

Based on the above apparatus example, referring to FIG. 4-FIG. 8, in a possible implementation, the apparatus may further include a second receiving module 340, a downloading module 350 and an establishing module 360.

Figure 4:
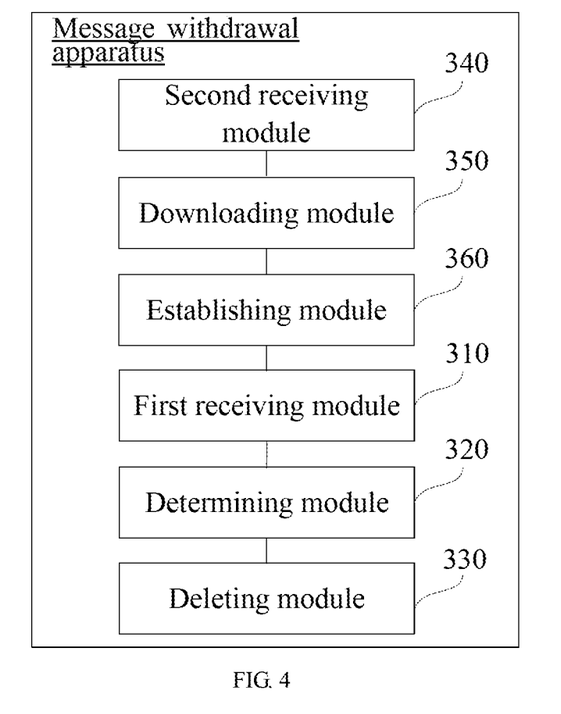
FIG. 4 is a block diagram illustrating a message withdrawal apparatus according to another example.

The second receiving module 340 may be configured to receive the target information where the target message may include the target network resource.

The second receiving module 340 may be a second receiver that may have at least one processor and a memory that is communicably connected with the at least one processor for storing instructions executable by the at least one processor. The execution of the instructions by the at least one processor may cause the at least one processor to receive the target information.

The downloading module 350 may be configured to download the target network resource included in the target message received by the second receiving module according to a downloading operation of a user.

The downloading module 350 may be downloader that may have at least one processor and a memory that is communicably connected with the at least one processor for storing instructions executable by the at least one processor. The execution of the instructions by the at least one processor may cause the at least one processor to download the target network resource.

The establishing module 360 may be configured to establish a mapping relation between the storage path of the target network resource downloaded by the downloading module 350 and the message identifier of the target message received by the second receiving module 340.

The establishing module 360 may be a mapping builder that may have at least one processor and a memory that is communicably connected with the at least one processor for storing instructions executable by the at least one processor. The execution of the instructions by the at least one processor may cause the at least one processor to establish the mapping relation between the storage path of the target network resource.

Figure 5:
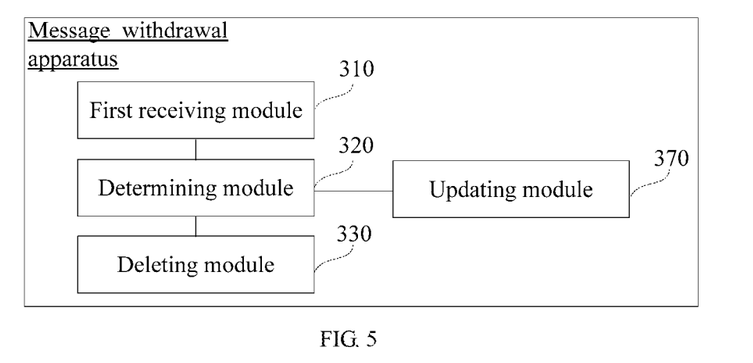
FIG. 5 is a block diagram illustrating the updating feature of the message withdrawal apparatus.

In another possible implementation, the apparatus may further include an updating module 370.

The updating module 370 may be configured to update the storage path of the target network resource in the mapping relation between the storage path or storage location of the downloaded network resource and the message identifier when it is detected that the storage path of the target network resource downloaded by the downloading module 350 is changed.

The updating module 370 may be an updater that may have at least one processor and a memory that is communicably connected with the at least one processor for storing instructions executable by the at least one processor. The execution of the instructions by the at least one processor may cause the at least one processor to update the storage path.

Figure 6:
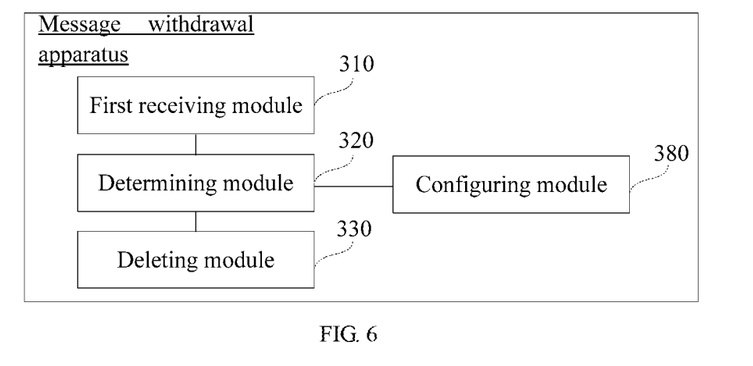
FIG. 6 is a block diagram illustrating the configuring feature of the message withdrawal apparatus.

In another possible implementation, the apparatus may further include a configuring module 380.

The configuring module 380 may be configured to take each of a target storage path corresponding to a copy-and-paste operation and the storage path of the target network resource as the storage path corresponding to the message identifier of the target message when the copy-and-paste operation on the target network resource downloaded by the downloading module 350 is detected.

The configuring module 380 may be a configurator that may have at least one processor and a memory that is communicably connected with the at least one processor for storing instructions executable by the at least one processor. The execution of the instructions by the at least one processor may cause the at least one processor to configure the the storage path.

In another possible implementation, the message withdrawal instruction received by the first receiving module 310 may be triggered when a message server receives a withdrawal request of a message sender for the target message.

Figure 7:
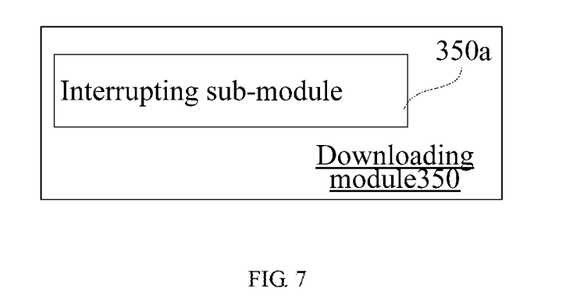
FIG. 7 is a block diagram illustrating a downloading module according to one example.

In another possible implementation, the downloading module 350 may include an interrupting sub-module 350a.

The interrupting sub-module 350a may be configured to interrupt a process of downloading the target network resources when the message withdrawal instruction is received in the process of downloading.

The interrupting sub-module 350a may be an interrupter that may have at least one processor and a memory that is communicably connected with the at least one processor for storing instructions executable by the at least one processor. The execution of the instructions by the at least one processor may cause the at least one processor to interrupt the process of downloading.

Figure 8:
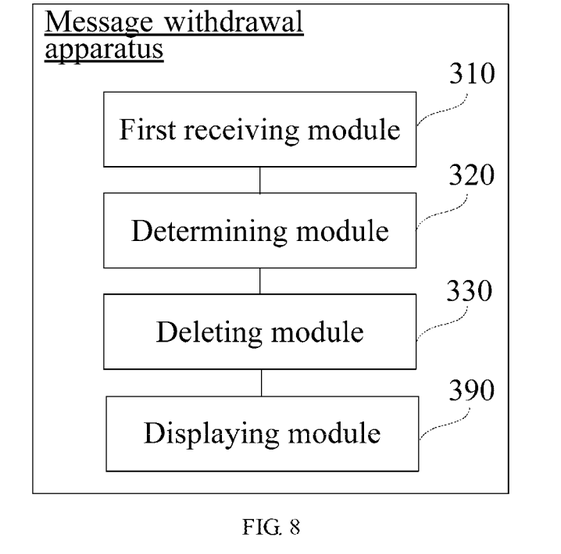
FIG. 8 is a block diagram illustrating a message withdrawal apparatus according to an additional example.

In another possible implementation, the apparatus may further include: a displaying module 390 configured to display a deletion prompt message, which indicates that the target network resource and the target message have been deleted locally.

The displaying module 390 may be a displayer that may have at least one processor and a memory that is communicably connected with the at least one processor for storing instructions executable by the at least one processor. The execution of the instructions by the at least one processor may cause the at least one processor to display a message.

In another possible implementation, the target network resource deleted by the deleting module 350 is a picture, a video, an audio, an animation or a document.

In order to determine the target network resource according to the message withdrawal instruction before executing the operation of deleting the target network resource, the terminal needs to establish a mapping relation between a message identifier of the target message and a local storage path of the target network resource after receiving the target message and downloading the target network resource included in the target message. As such, when the withdrawal instruction of the target message is received, the terminal can determine the target network resource according to the message identifier included in the withdrawal instruction and the mapping relation.

The message received by the terminal may be sent by any other terminal, and the message may only include the network resource. The message may also include the network resource and other contents.

The target network resource may also refer to a compressed file of any of the above forms of resources.

After the terminal receives the target message sent by any other terminal, the user may download the target network resource included in the target message. The terminal may download the target network resource to a storage position designated by the user when the terminal detects the downloading operation of the user on the target network resource. Accordingly, the terminal may obtain a storage path of the target network resource. The terminal may also download the target network resource to a system default storage position.

If a message withdrawal instruction is received in the process of downloading the target network resource, the terminal may prevent the user from performing any operation on the target message. For example, the terminal allows no operation to be executed by the user in a currently displayed interaction interface until the target message is withdrawn. Operations not allowed to be executed include but are not limited to operations such as forwarding, collecting or copying.

The message identifier of the target message is used for uniquely identifying the target message, so that the terminal can uniquely determine the target message according to the message identifier.

The terminal may maintain a database, which takes the message identifier as an index to store the mapping relation between the storage path of the target network resource and the message identifier of the target message. Based on the mapping relation, the terminal may uniquely determine the storage path of the target network resource according to the message identifier of the target message.

The user may also copy and paste the downloaded target network resource. In such case, the copied and pasted target network resource corresponds to a new storage path. In order to ensure thorough deletion of the target network resource, the copied and pasted target network resource also needs to be deleted. The terminal not only establishes the mapping relation between the storage path of the target network resource and the message identifier of the target message, but also establishes the mapping relation between the mapping relation between the target storage path corresponding to the copy-and-paste operation and the message identifier of the target message.

The message withdrawal instruction is triggered when a message server receives a withdrawal request of a message sender for the target message. The message sender, who wants to withdraw a sent message, may submit the withdrawal request for the target message, which may include the message identifier of the target message, to the server by a message withdrawal key provided by a client. The server receives the withdrawal request for the target message and sends to a target message receiving terminal a message withdrawal instruction which includes the message identifier of the target message. Then, the target message receiving terminal deletes the target message and the network resource belonging to the target message.

When receiving the target message withdrawal instruction pushed by the server, the terminal obtains the message identifier included in the target message withdrawal instruction.

The terminal may determine the storage path of the target network resource from the database according to the message identifier included in the message withdrawal instruction and the mapping relation between the storage path of the downloaded network resource and the message identifier stored in the database. Then, the target network resource is found.

After a message is received, the message may be stored in a designated folder, and the terminal deletes the target message to be withdrawn from the designated folder.

By displaying a prompt after the terminal deletes the target network resource and the target message, the user can be prevented from being confused by automatic deleting, and user experience may be improved.

Regarding the apparatus of above examples, specific manners for respective modules to perform operations have been described in detail in related method examples and will be not elaborated herein.

The present example provides a terminal, and the terminal may be configured to execute the message withdrawal method provided in the above examples.

Figure 9:
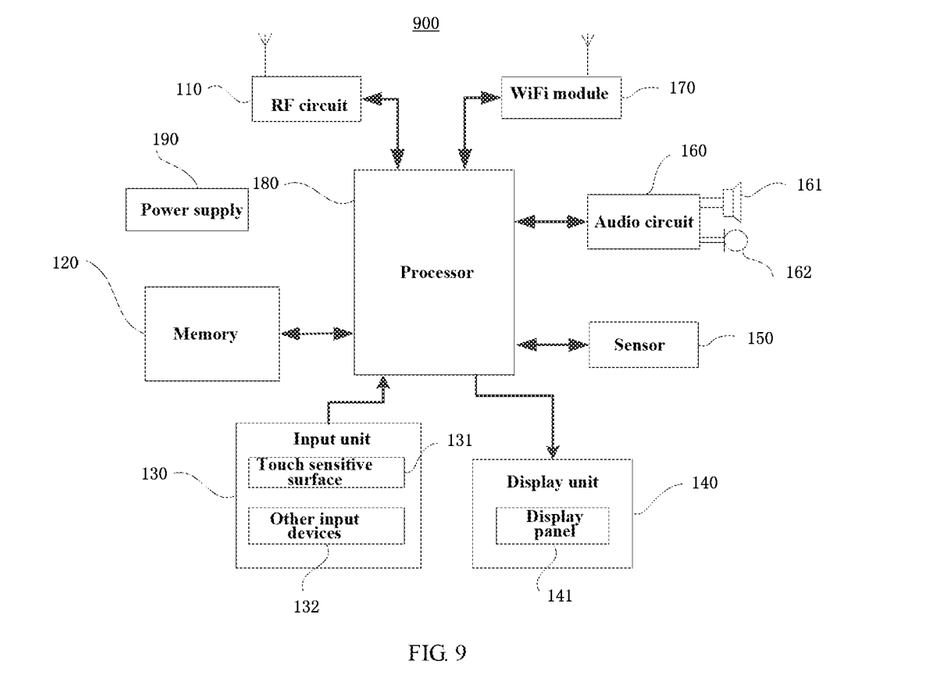
FIG. 9 is a block diagram illustrating a terminal according to one example.

Referring to FIG. 9, the terminal 900 includes a radio frequency (RF) circuit 110, a memory 120 including one or more computer-readable storage mediums, an input unit 130, a display unit 140, a sensor 150, an audio circuit 160, a wireless fidelity (WiFi) module 170, a processor 180 including one or more processing cores, a power supply 190, etc. It should be appreciated by those skilled in the art that the terminal structure shown in FIG. 9 does not constitute a limitation to the terminal device. Rather, the terminal may include more or less components than illustrated, some of the components may be combined, or there are different component arrangements.

The RF circuit 110 may be configured to transmit and receive information, or to transmit and receive signals during a calling procedure. In particular, the RF circuit 110 receives downlink information from a base station, and then transfers the information to one or more processors 180 to be processed. Also, the RF circuit 110 transmits uplink data to the base station. Generally, the RF circuit 110 includes but is not limited to include an antenna, at least one amplifier, a tuner, one or more oscillators, a subscriber identity module (SIM) card, a transceiver, a coupler, an LNA (Low Noise Amplifier), a duplexer, etc. Furthermore, the RF circuit 110 may communicate with other devices through wireless communication over a network. The wireless communication may use any of communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc.

The memory 120 may be configured to store software programs and modules. The processor 180 performs various functional applications and data processing by running the software programs and modules stored in the memory 120. The memory 120 may mainly include a program storage area and a data storage area. The program storage area may store operating systems, application programs required by at least one function (such as a function of sound playing, a function of image playing, etc.), etc. The data storage area may store data created during operation of the terminal 900 (such as audio data, phone book, etc.), etc. In addition, the memory 120 may include a high-speed random access memory and may also include a non-volatile memory. For example, the memory 120 may include at least one disk storage device, a flash memory device, or other volatile solid-state memory devices. Accordingly, the memory 120 may also include a memory controller to provide access to the memory 120 by the processor 180 and the input unit 130.

The input unit 130 may be configured to receive input numbers or characters, and generate keyboard, mouse, joystick, optical or trackball input signals related to a user setting and the functional control. Optionally, the input unit 130 may include a touch sensitive surface 131 and other input devices 132. The touch sensitive surface 131, also known as a touch screen or a touch pad, may collect user's touch operations on or near the touch sensitive surface 131 (such as an operation performed by users using any suitable object or accessory such as a finger, a touch pen and the like on or near the touch sensitive surface 131), and drive a corresponding connected device according to a preset program. Optionally, the touch sensitive surface 131 may include two parts: a touch detection device and a touch controller. The touch detection device detects a touching position of the user, detects a signal caused by the touch operation, and transmits the signal to the touch controller. The touch controller receives touch information from the touch detection device, transforms it into coordinates of the touch point, and sends the coordinates to the processor 180. The touch controller may also receive an instruction from the processor 180 and execute the instruction. In addition, the touch sensitive surface 131 may be realized in various types, such as resistive type, capacitive type, infrared type and surface acoustic wave type, etc. In addition to the touch sensitive surface 131, the input unit 130 may also include other input devices 132. Optionally, these other input devices 132 may include but are not limited to one or more of a physical keyboard, functional keys (such as volume control keys, switch buttons, etc.), a trackball, a mouse, a joystick, etc.

The display unit 140 may be configured to display information input by the user or information provided for the user and various graphical user interfaces of the terminal 900. These graphical user interfaces may be composed of graphics, texts, icons, videos, and any combination thereof. The display unit 140 may include a display panel 141, which optionally may be configured in the form of LCD (Liquid Crystal Display), OLED (Organic Light-Emitting Diode), etc. Further, the touch sensitive surface 131 may cover the display panel 141. When a touch operation on or near the touch sensitive surface 131 is detected by the touch sensitive surface 131, the touch operation is sent to the processor 180 to determine the type of touch event. Subsequently, corresponding visual outputs will be provided on the display panel 141 by the processor 180 according to the type of touch event. Although in FIG. 9 the touch sensitive surface 131 and the display panel 141 are shown as two separate components to realize input and output functions, in some examples, the touch sensitive surface 131 and the display panel 141 may be integrated to realize input and output functions.

The terminal 900 may further include at least one kind of sensor 150, such as a light sensor, a motion sensor and other sensors. Optionally, the light sensor may include an ambient light sensor and a proximity sensor. The ambient light sensor may adjust the luminance of the display panel 141 according to the brightness of the ambient light. The proximity sensor may turn off the display panel 141 and/or backlight when the terminal 900 moves close to ear. As one kind of the motion sensor, a gravity acceleration sensor may detect the acceleration in each direction (typically on three axes), and may detect the magnitude and the direction of gravity when it is stationary. The detection results may be used in the applications recognizing the attitudes of the mobile phone (such as horizontal and vertical screen switching, related games, attitude calibration of a magnetometer), functions related to vibration recognizing (such as a pedometer, clicking), etc. The terminal 900 may also be equipped with other sensors such as a gyroscope, a barometer, a hygrometer, a thermometer, an infrared sensor, etc., which will not be redundantly described herein.

The audio circuit 160, a speaker 161 and a microphone 162 may provide an audio interface between the user and the terminal 900. The audio circuit 160 may transform received audio data into electrical signals which are transmitted to the speaker 161 and transformed into sound signals to be output by the speaker 161. On the other hand, the microphone 162 transforms collected sound signals into electrical signals which are received and transformed into audio data by the audio circuit 160. After being output to the processor 180 to be processed, the audio data is transmitted to, for example, another terminal device via the RF circuit 110, or output to the memory 120 for further processing. The audio circuit 160 may also include an earphone jack to allow communications between a peripheral earphone and the terminal 900.

WiFi is a short-range wireless transmission technology. The terminal 900 allows the user to send and receive emails, browse webpages and access streaming media, etc. through the wireless communication unit 170, which provides the user with access to a wireless broadband Internet. Although FIG. 9 shows the wireless communication unit 170, it should be appreciated that the wireless communication unit 170 is not a necessary component of the terminal 900 and may be omitted as desired without changing the essential scope of the disclosure.

The processor 180 is a control center of the terminal 900, connects to various parts of the entire mobile phone through various interfaces and circuits, and performs various functions and data processing of the terminal 900 by running or executing the software programs and/or modules stored in the memory 120 and by invoking data stored in the memory 120, so as to perform overall monitoring of the mobile phone. Optionally, the processor 180 may include one or more processing cores. Optionally, the processor 180 may has an application processor and a modem processor integrated therein. The application processor mainly handles operating systems, user interfaces and application programs, and the modem processor mainly handles wireless communications. It should be appreciated that the above modem processor may not be integrated into the processor 180.

The terminal 900 may also include a power supply 190 (such as a battery) to supply power to each component. Optionally, the power supply may be logically connected to the processor 180 through a power supply management system, so as to realize the functions such as charge, discharge and power consumption managements, etc. through the power supply management system. The power supply 190 may also include one or more components of a DC or AC power source, a recharge system, a power failure detection circuit, a power converter or inverter, a power status indicator, etc.

Although not shown, the terminal 900 may also include a camera, a Bluetooth module, etc., which are not redundantly described herein. In the present example, a display unit of the terminal is a touch screen display, and the terminal further includes a memory and one or more programs. The one or more programs are stored in the memory and are configured to be executed by one or more processors. The one or more programs cause the message withdrawal method provided in the examples shown in FIG. 1 or FIG. 2 to be executed.

It should be understood by those skilled in the art that all or a part of the steps of the above examples may be implemented through hardware or through a program that instructs related hardware. The program may be stored on a computer-readable storage medium which may be a read-only memory, magnetic or optical disk, etc.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

The foregoing are only preferred examples of the disclosure, and do not intend to limit the disclosure. Any variation, equivalent substitution and modification that fall within the spirit and principle of the present disclosure should be embraced by the protection scope of the disclosure.

The invention claimed is:

1. A message withdrawal method applied in a terminal, comprising:
   receiving a target message, wherein the target message comprises a target network resource;
   downloading the target network resource included in the target message according to a downloading operation of a user;
   establishing a mapping relation between a storage path of the target network resource and a message identifier of the target message;
   receiving, by the terminal, a message withdrawal instruction, wherein the message withdrawal instruction at least comprises the message identifier of a target message to be withdrawn;
   determining, by the terminal, the storage path of the target network resource according to the mapping relation between the storage path of the downloaded network resource and the message identifier, wherein the storage path identifies a storage position of the target network resource in the terminal;
   deleting, by the terminal, the target message in the terminal using the message identifier; and
   deleting, by the terminal, the target network resource at the storage position in the terminal;
   wherein the method further comprises interrupting a process of downloading the target network resource under the condition the message withdrawal instruction is received in the process of downloading.

2. The method according to claim 1, after establishing the mapping relation between the storage path of the target network resource and the message identifier of the target message, the method further comprising:
   updating the storage path of the target network resource in the mapping relation between the storage location of the downloaded network resource and the message identifier when a change of the storage path of the target network resource is detected.

3. The method according to claim 1, after establishing the mapping relation between the storage path of the target network resource and the message identifier of the target message, the method further comprising:
   taking each of a target storage path corresponding to a copy-and-paste operation and the storage path of the target network resource as the storage path corresponding to the message identifier of the target message when the copy-and-paste operation on the target network resource is detected.

4. The method according to claim 1, wherein the message withdrawal instruction is triggered when a message server receives a withdrawal request from a message sender for the target message.

5. The method according to claim 1, after deleting the target network resource at the storage path of the target network resource, the method further comprising:
   displaying a deletion prompt message which indicates that the target network resource and the target message have been deleted locally in the terminal.

6. The method according to claim 1, wherein the target network resource includes at least one of the following elements: a picture, a video, an audio, an animation and a document; and
   wherein the method further comprises:
   when detecting that the storage path of the target network resource is changed, obtaining the changed storage path in the terminal, and updating an original storage path with the changed storage path in a mapping relation in the terminal.

7. A message withdrawal apparatus, comprising:
   a processor; and
   a memory for storing instructions executable by the processor,
   wherein the processor is configured to:
   receive a target message, wherein the target message comprises a target network resource;
   download the target network resource included in the target message according to a downloading operation of a user;
   establish a mapping relation between a storage path of the target network resource and a message identifier of the target message;
   receive a message withdrawal instruction, wherein the message withdrawal instruction at least comprises the message identifier of the target message to be withdrawn;
   determine the storage path of the target network resource according to the mapping relation between the storage path of the downloaded network resource and the message identifier, wherein the storage path identifies a storage position of the target network resource in the terminal;
   delete the target message using the message identifier; and
   delete the target network resource at the storage position in the terminal,
   wherein the processor is further configured to interrupt a process of downloading the target network resource under the condition the message withdrawal instruction is received in the process of downloading.

8. The apparatus of claim 7, wherein the processor is further configured to: after establishing the mapping relation between the storage path of the target network resource and the message identifier of the target message, update the storage path of the target network resource in the mapping relation between the storage location of the downloaded network resource and the message identifier when a change of the storage path of the target network resource is detected.

9. The apparatus of claim 7, wherein the processor is further configured to: after establishing the mapping relation between the storage path of the target network resource and the message identifier of the target message, take each of a target storage path corresponding to a copy-and-paste operation and the storage path of the target network resource as the storage path corresponding to the message identifier of the target message when the copy-and-paste operation on the target network resource is detected.

10. The apparatus of claim 7, wherein the message withdrawal instruction is triggered when a message server receives a withdrawal request from a message sender for the target message.

11. The apparatus of claim 7, wherein the processor is further configured to: after deleting the target network resource at the storage path of the target network resource, display a deletion prompt message which indicates that the target network resource and the target message have been deleted locally in the terminal.

12. The apparatus of claim 7, wherein the target network resource includes at least one of the following elements: a picture, a video, an audio, an animation and a document.

13. A non-transitory computer-readable storage medium having stored instructions therein, wherein the stored instructions, when executed by a processor of a mobile terminal, cause the mobile terminal to: receive a target message, wherein the target message comprises a target network resource; download the target network resource included in the target message according to a downloading operation of a user; establish a mapping relation between a storage path of the target network resource and a message identifier of the target message; receive a message withdrawal instruction, wherein the message withdrawal instruction at least comprises the message identifier of the target message to be withdrawn, determine the storage path of the target network resource according to the mapping relation between the storage path of the downloaded network resource and the message identifier, wherein the storage path identifies a storage position of the target network resource in the terminal, delete the target message using the message identifier, and delete the target network resource at the storage position in the terminal, wherein the stored instructions, when executed by a processor of a mobile terminal, further cause the mobile terminal to interrupt a process of downloading the target network resource under the condition the message withdrawal instruction is received in the process of downloading.

14. The storage medium of claim 13, wherein, after the mapping relation is established between the storage path of the target network resource and the message identifier of the target message, the instructions further cause the processor to:

update the storage path of the target network resource in the mapping relation between the storage location of the downloaded network resource and the message identifier when a change of the storage path of the target network resource is detected.

15. The storage medium of claim 14, wherein, after the mapping relation is established between the storage path of the target network resource and the message identifier of the target message, the instructions further cause the processor to:

take each of a target storage path corresponding to a copy-and-paste operation and the storage path of the target network resource as the storage path corresponding to the message identifier of the target message when the copy-and-paste operation on the target network resource is detected.

* * * * *